Oct. 11, 1949.  E. A. CONAWAY  2,484,077
COMBINED FREIGHT CAR LOCK AND SEAL
Filed March 21, 1946  4 Sheets-Sheet 1
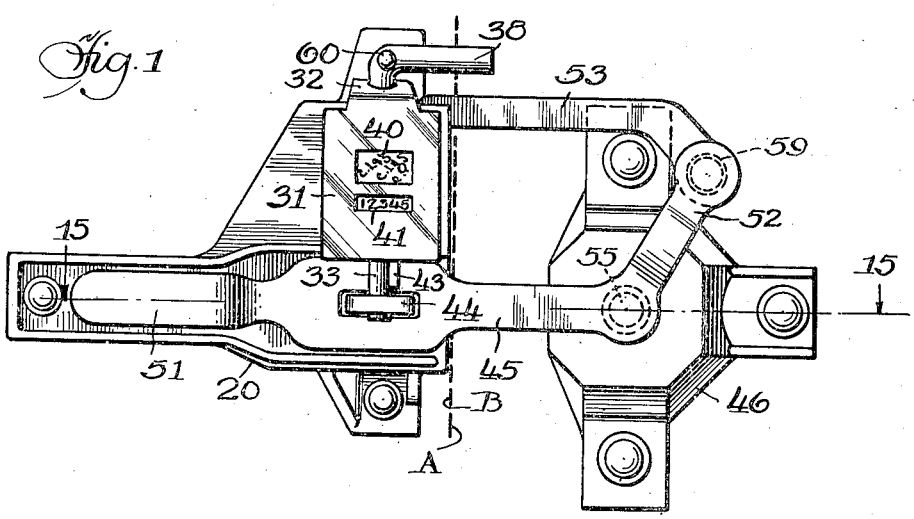
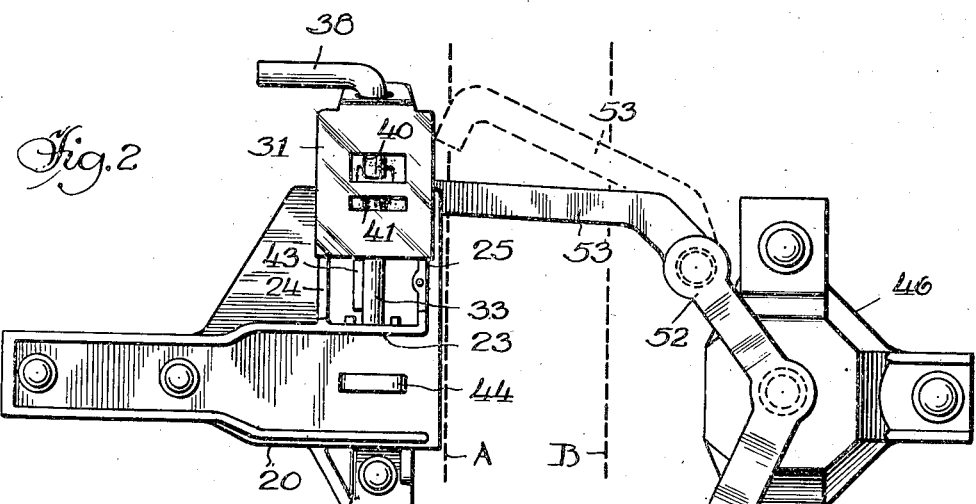
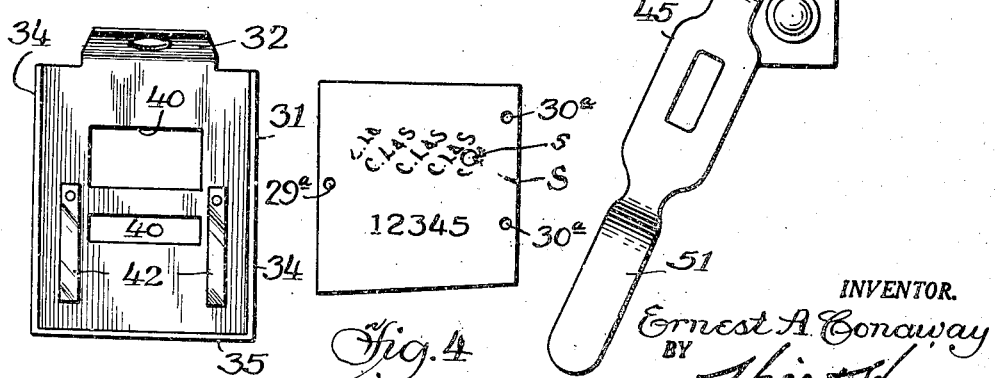
INVENTOR.
Ernest A. Conaway
BY
his Attys.

Oct. 11, 1949.  E. A. CONAWAY  2,484,077
COMBINED FREIGHT CAR LOCK AND SEAL
Filed March 21, 1946  4 Sheets-Sheet 2

INVENTOR.
Ernest A. Conaway
BY
his Attys

Oct. 11, 1949. E. A. CONAWAY 2,484,077
COMBINED FREIGHT CAR LOCK AND SEAL
Filed March 21, 1946 4 Sheets-Sheet 3
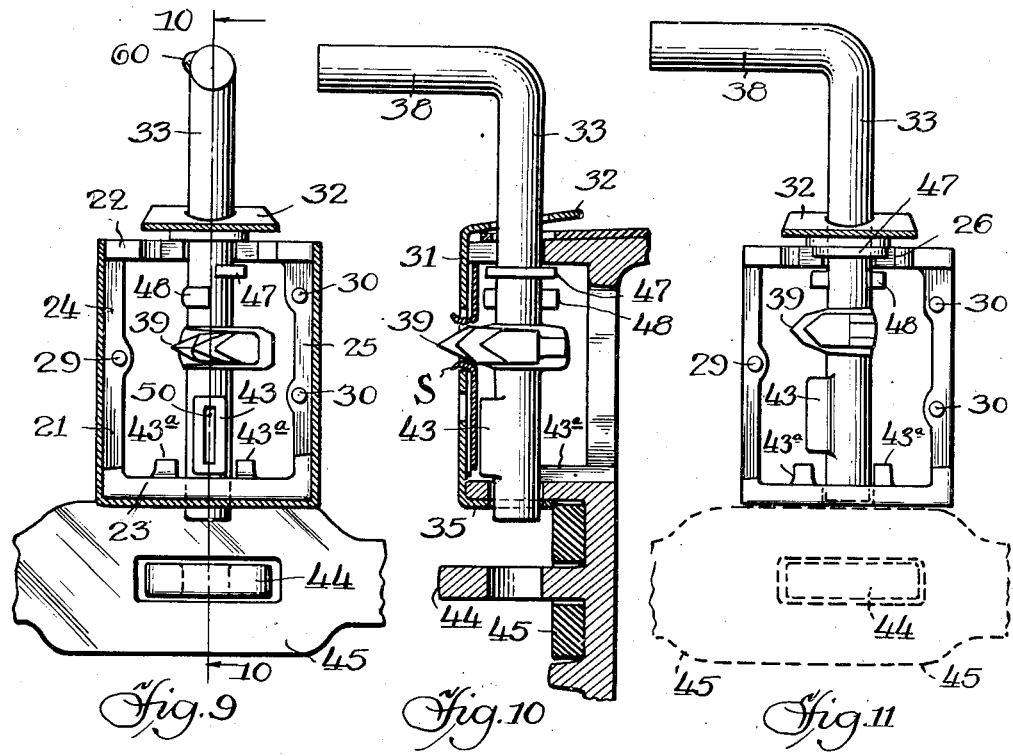
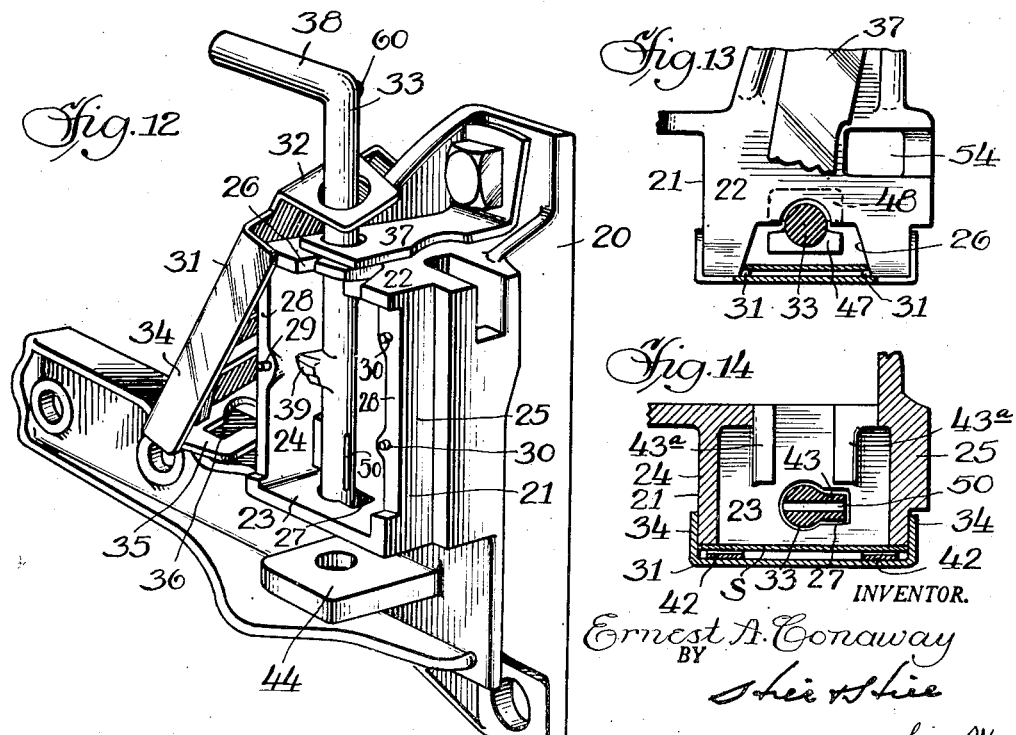
INVENTOR.
Ernest A. Conaway
BY
his Attys.

Oct. 11, 1949.  E. A. CONAWAY  2,484,077
COMBINED FREIGHT CAR LOCK AND SEAL
Filed March 21, 1946  4 Sheets-Sheet 4
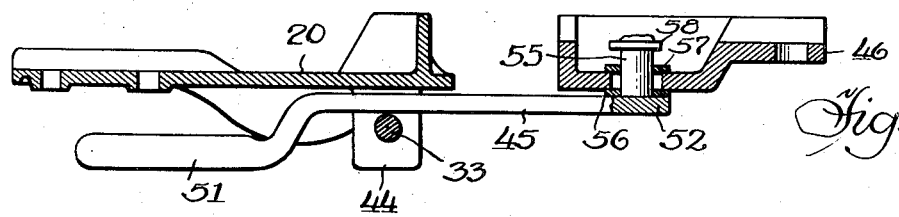
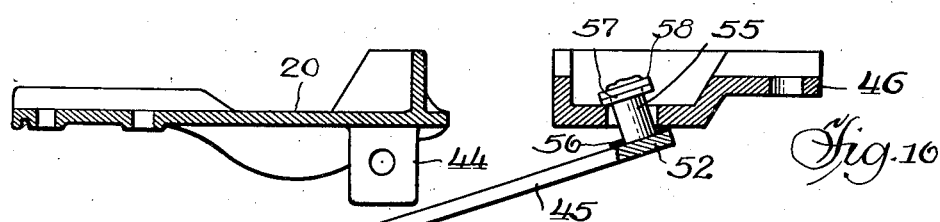
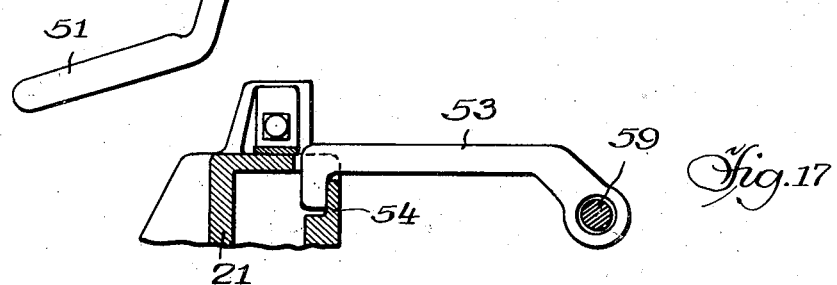
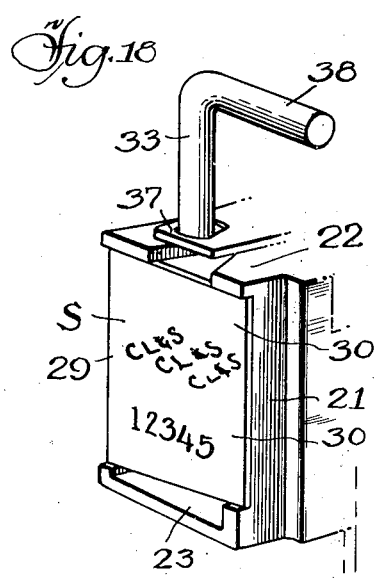
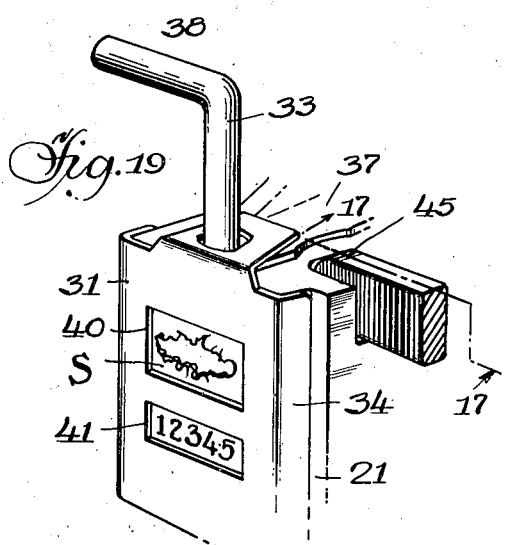
INVENTOR.
Ernest A. Conaway
BY
his Attys.

Patented Oct. 11, 1949

2,484,077

UNITED STATES PATENT OFFICE 2,484,077

COMBINED FREIGHT CAR LOCK AND SEAL

Ernest A. Conaway, Chicago, Ill.

Application March 21, 1946, Serial No. 656,025

11 Claims. (Cl. 292—287)

This invention relates to an improvement in a combined freight car lock and sealing device and one of its objects is to provide seal rupturing means which operates to rupture the seal during the operation of unlocking the lock.

Another object is to provide a seal rupturing element which is positive in its action and renders the seal useless for further sealing purposes.

Another object is to provide a housing for containing the locking bolt and also for containing a seal, covered by a housing cover but visible through a window in the cover, whereby the inspector or other attendant can, by glancing at the seal, observe whether or not it has been ruptured, thereby indicating that some unauthorized person has had access to the interior of the freight car if the seal is ruptured.

Another object is to provide a hasp member fulcrumbed upon the freight car door and provided with a handle and with a hook cooperating with the housing whereby the car door may be drawn into its fully closed position without resorting to any great effort.

With these and other objects and advantages in view, this invention consists in the several novel features of construction, arrangement and combination of parts hereinafter fully set forth and more particularly defined in the appended claims.

The invention is clearly illustrated in the drawings accompanying this specification, in which:

Fig. 1 is a front elevation of a combined freight car lock and seal embodying one form of the invention and showing the same in locked position;

Fig. 2 is a front elevation of the same parts seen in Fig. 1 except that the door is partially open and the housing cover partly raised;

Fig. 3 is a side elevation of the housing cover looking at the inner side thereof;

Fig. 4 is a side elevation of one of the seals used in the device;

Fig. 9 is a fragmental front elevation with the cover in section and showing the locking bolt in its intermediate raised position with the locking bolt partially rotated whereby to accomplish the rupturing operation;

Fig. 10 is a vertical cross section taken on the line 10—10 of Fig. 9;

Fig. 11 is a fragmental front elevation of the housing showing the locking bolt at the extreme upper limit of its movement;

Fig. 12 is a perspective view of the housing bracket, the housing and the lock bolt, and showing the cover in open position;

Fig. 13 is a horizontal section taken on the line 13—13 of Fig. 7;

Fig. 14 is a horizontal section taken on the line 14—14 of Fig. 8;

Fig. 15 is a detail horizontal section taken on the line 15—15 of Fig. 1 and showing the hasp member in its closed position;

Fig. 16 is a view similar to Fig. 15 but showing the hasp member disconnected from the eye member of the housing structure;

Fig. 17 is a detail view partly in side elevation and partly in vertical section taken on the line 17—17 of Fig. 19;

Fig. 18 is a fragmental perspective view of the housing with a seal seated therein; and Fig. 19 is a fragmental perspective view of the housing with the cover applied thereto and showing a ruptured seal.

Figure 5:
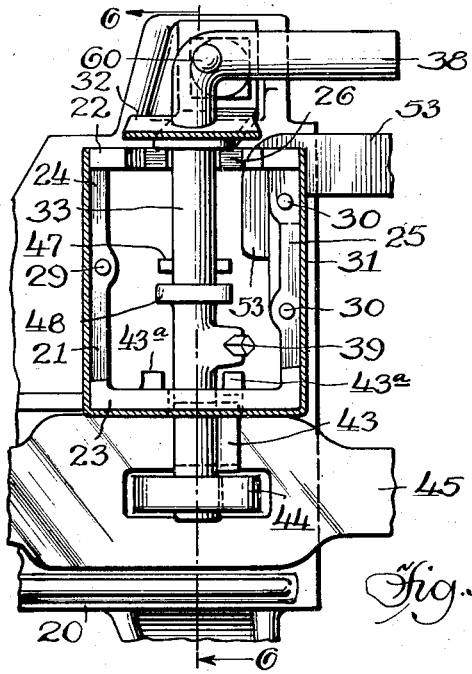
Fig. 5 is a fragmental front elevation of the device in locked condition with the cover shown in section.

Referring to said drawings, which are merely illustrative of one embodiment of the invention, the reference character A designates a fragment of a freight car wall and B designates a fragment of a car door. Bolted, riveted or otherwise rigidly secured to the wall A adjacent the door opening is a bracket member 20 which is cast with a housing 21 on its front face. The housing is formed with top and bottom walls 22, 23 and side walls 24, 25. In the front portion of the top wall is a notch 26 and in the bottom wall is a keyhole slot 27, the purposes of which will appear later on in this specification. The front edges of the side walls are set back from the front of the housing to provide seats 28 upon which a seal S may be seated. Locating pins 29, 30 project forward from the seats and the seals are formed with correspondingly located apertures 29a, 30a (see Fig. 4) whereby a seal may be buttoned upon the pins.

Preferably a small hole s is formed in the seal at a point adjacent the place where the seal rupturing element encounters the seal. This enables the seal rupturing element to more readily tear the seal. The seal may be formed of sheet metal, cardboard and the like with the apertures of cardboard seals reinforced with metal eyes.

As a preference, the lower edge of each seal slopes gently as is shown in Fig. 4 and the upper edges of the lower portions of the side walls beyond the seats are inclined on the same angle as the lower edges of the seals.

Cooperating with the housing is a cover 31 which is arranged to cover the open front of the housing after a seal has been seated on the seats 28 and, as shown, said cover is formed with an apertured flange 32 which is arranged to surround the hereinafter described locking bolt 33 so as to movably connect the cover with the locking bolt. A protuberance 60 on the locking bolt prevents the cover from being disconnected from the locking bolt. The cover is formed with side flanges 34 which overlap the side walls of the housing when the cover is applied thereto and on the lower edge of the cover is a flange 35 which is provided with a keyhole slot 36 which registers with the keyhole slot in the bottom wall of the housing when the cover is applied thereto.

The lower end of the locking bolt is guided to move in the keyhole slots and its upper end is guided to move by an L-shaped metal strip 37 which is bolted to a foot of the bracket member 20. The locking bolt is guided for movement lengthwise of itself and also for rotatory movement and its upper end is formed with a handle 38 by means of which it may be manipulated.

Figure 6:
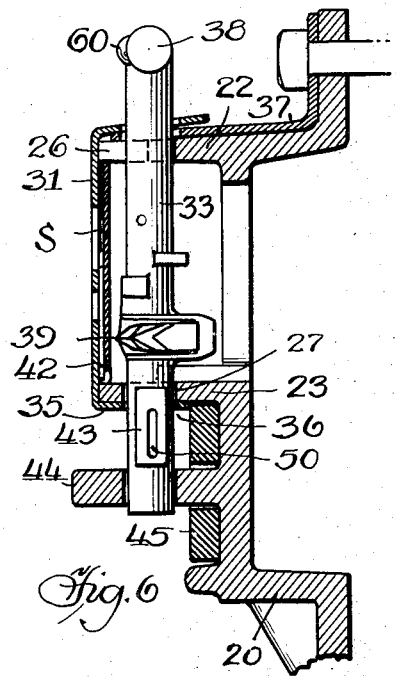
Fig. 6 is a vertical cross section taken on the line 6—6 of Fig. 5.
Figure 7:
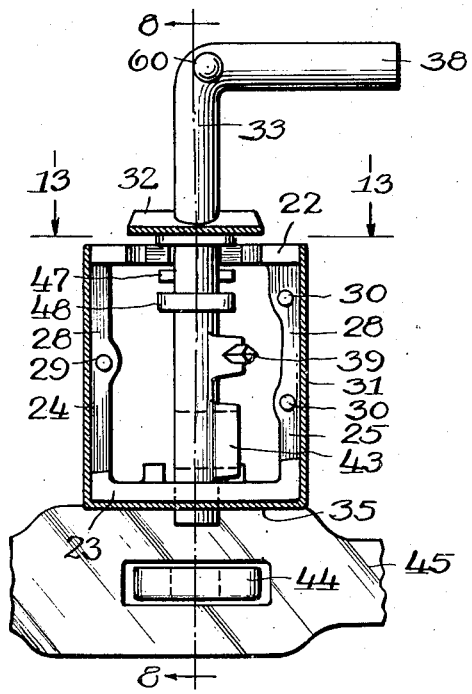
Fig. 7 is a fragmental front elevation with the cover shown in section and illustrating the locking bolt in its intermediate raised position.
Figure 8:
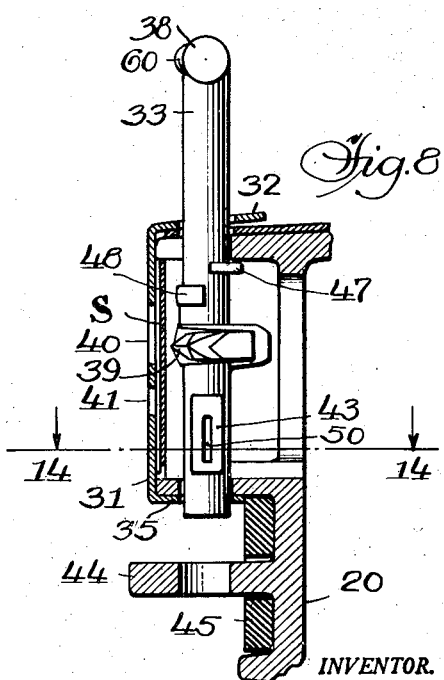
Fig. 8 is a vertical cross section taken on the line 8—8 of Fig. 7.

Intermediate its ends, the locking bolt is provided with a sharp seal rupturing element 39 (see Figs. 5 to 12 inclusive) by means of which the seal is ruptured whenever the device is being unlocked. During the operation of rupturing the seal, the seal rupturing element is disposed directly behind a window or slot 40 formed in the cover and below said window or slot is a second slot 41 through which a serial number or other identification data on the seal is visible.

Two flat springs 42 (see Fig. 3) are riveted or otherwise secured to the cover 31 on its inner face and when the cover is applied to the housing the springs 42 press against the seal with their lower ends bearing on the bottom wall so that the cover is held stationary by the flange 35 and springs 42 which are disposed immediately above and below the bottom wall of the housing.

Adjacent the lower end of the locking bolt it is formed with a lug 43 which in the lowermost position of the locking bolt extends through the keyhole slots 27 and 36 and rests upon an eye member 44 which extends forward from the bracket member 20 at a short distance below the housing and is arranged to cooperate with a hasp member 45 to lock the door, which hasp member is fulcrumed upon a bracket 46 bolted, riveted or otherwise rigidly fastened to the door of the car. When the locking bolt occupies its lowermost position (see Figs. 1 and 5) the lug 43 and the edges of the keyhole slots prevent rotation of the locking bolt, and it can only be rotated by first withdrawing the lug 43 from the keyhole slots. Two ribs 43a, which project up from the bottom wall of the housing, one on each side of the locking bolt, provide stop members that cooperate with the lug 43 to limit rotation of the locking bolt through an arc of 180 degrees, which is all of the rotatorial movement necessary for the operation of the locking bolt.

For automatically locating the locking bolt with its seal rupturing element directly behind the window 40 in position to rupture the seal when the locking bolt is partially rotated, a lug 47 is formed upon the locking bolt which encounters the top wall 22 of the housing (see Figs. 7 to 11 inclusive) when the locking bolt is drawn upward from its locked position to an intermediate position. However, when the locking bolt is partially rotated in a clock-wise direction, the seal rupturing element encounters the seal and ruptures the same (see Fig. 10). The continued rotation of the locking bolt brings the lug 47 into registry with the notch 26 of the top wall of the housing, thereby permitting further upward movement of the locking bolt. When the latter occupies a position in which it can be partially rotated, the lug 43 has been withdrawn from the keyhole slots, but the lower end of the locking bolt still projects slightly below the flange of the cover and stands in front of the hasp member, thereby preventing the latter from being detached from the eye member 44 (see Figs. 7 and 8). When, however, the rupturing of the seal has been accomplished and the locking bolt has been further rotated, the lug 47 enters the notch 26, permitting further upward movement of the locking bolt until it is withdrawn from the flange 35 of the cover with its lower end engaged in the keyhole slot in the bottom wall of the housing. At this moment another lug 48 upon the locking bolt, located slightly below the lug 47, encounters the top wall 22 of the housing and prevents further upward movement of the locking bolt. At the same time the lug 43 encounters one of the ribs 43a and stops its rotatorial movement. In this position of the locking bolt the hasp member can now be detached from the eye member and the cover can be raised and swung to one side of the open housing whenever a fresh seal is to be buttoned upon the seats 28 of the housing. However, before a fresh seal is attached the hasp member must first be engaged with the eye member, the locking bolt must be lowered until the lug 43 rests on the bottom wall of the housing and then the locking bolt must be turned in a contra-clockwise direction until the lug encounters the other rib 43a, with the handle of the locking bolt extending in the direction of the car door. In this position the lower end of the locking bolt projects slightly below the lower side of the bottom wall of the housing but the lower flange of the cover can be readily sprung over it to engage it therewith.

The locking bolt is then lowered, bringing its lower end through the eye member and in front of the hasp member. A slot 50 may be provided through the locking bolt and its lug 43 through which a strap or wire of a car seal (not shown) may be passed to prevent operation of the locking bolt until the strap or wire has been severed and withdrawn.

To facilitate the final closing and initial opening of the door, the hasp member 45 is provided with a handle 51 and the hasp member is shown to be in the form of a bell crank lever, the arm 52 of which is connected to a hook member 53 which can be manually engaged in a recess 54 (see Fig. 17) formed in the housing 21. The bell crank lever is provided with a stud 55 which extends through an oversize hole in the bracket 46 and forms the fulcrum for the bell crank lever. Upon the stud on both sides of the wall of the bracket are washers 56, 57 and on the free end of the stud a washer 58 is welded to it. The hook member 53 is pivotally connected to the end of the arm 52 by a stud 59 formed on the arm 52 and extending through a hole in the hook member with a washer welded to the end of the stud.

To close the door with the hasp and hook means, the door is closed to the point where the hook can be engaged in the recess 54. The hasp member is then swung upward thereby drawing the door to its fully closed position and the hasp member is then engaged with the eye member. Instead of employing the bell crank hasp member and hook, an ordinary hasp may be used.

While I have shown and described the combined lock and seal applied to a freight car, it is obvious that it may be applied to many other objects, such as refrigerator cars, tank cars, trucks and containers of all kinds requiring to be locked and sealed. To adapt the device for such various objects, the brackets are necessarily altered to fit the parts upon which they are to be secured. When used on double doors, the housing member is secured to one door and the hasp member to another one.

Having thus described my invention, it is obvious that various immaterial modifications may be made in the same without departing from the spirit of my invention; hence, I do not wish to be understood as limiting myself to the exact form, construction, arrangement and combination of parts herein shown and described or uses mentioned.

What I claim as new and desire to secure by Letters Patent is:

1. In a device of the class described, the combination of a housing having an open front, a seat for a seal and a bolt hole in its bottom wall; a slotted cover arranged to cover said open front of the housing, said cover having an apertured flange arranged to extend underneath the bottom wall of the housing with said aperture in register with said bolt hole, a longitudinally movable and rotatable locking bolt disposed behind a seal seated upon said seat, and guided to move in said housing, said locking bolt being arranged to lock the cover to the housing and to lock a hasp member to an eye associated with the housing, and said locking bolt having a handle located exteriorly of the housing, and one end of said locking bolt being adapted to be projected through the bolt hole and aperture to lock the hasp member upon the eye, a seal rupturing element carried by said locking bolt and arranged to rupture the seal upon partial rotation of the locking bolt, and cooperating stop means on the housing and locking bolt for locating the seal rupturing element with respect to the seal when the locking bolt is raised toward its upper limit of movement.

2. In a device of the class described, the combination of a housing having an open front, a seat for a seal and a key hole slot in its bottom wall; a slotted cover arranged to cover said open front of the housing, said cover having a flange provided with a keyhole slot and arranged to extend underneath the bottom wall of the housing with the keyhole slots in register, a longitudinally movable and rotatable locking bolt disposed behind the seal and guided to move in an axial direction and in a rotatorial direction in said housing, said locking bolt being arranged to lock the cover to the housing and to lock a hasp member to an eye associated with the housing, and said locking bolt having a handle located exteriorly of the housing and one end of said locking bolt being adapted to be projected through the keyhole slots in the bottom wall of the housing and in the flange of the cover, a seal rupturing element carried by said locking bolt arranged to rupture a seal when raised to an intermediate position and upon partial rotation of the locking bolt, cooperating stop means on the housing and locking bolt for locating the seal rupturing element with respect to the seal when the locking bolt is raised to an intermediate raised position, and a radially extending lug on and adjacent the lower end of the bolt arranged to be projected through said keyhole slots, and arranged when the locking bolt is raised and rotated to rest upon the bottom wall of the housing and support the bolt therein.

3. In a device of the class described, the combination of a housing having an open front, a seat for a seal, a notch in its top wall and a bolt hole in its bottom wall; a slotted cover arranged to cover the open front of the housing, said cover having an apertured flange arranged to extend underneath the bottom wall of the housing with said aperture in register with said bolt hole, a longitudinally movable and rotatable locking bolt disposed behind the seal and guided to move in said housing, said locking bolt being arranged to lock the cover to the housing and to lock a hasp member to an eye associated with the housing and said locking bolt having a handle located exteriorly of the housing, and one end of said locking bolt being adapted to be projected through the bolt hole and aperture to lock the hasp member upon the eye, a seal rupturing element carried by said locking bolt arranged to rupture the seal upon the raising and partial rotation of the locking bolt, cooperating means on the housing and locking bolt for locating the seal rupturing element with respect to the seal when the locking bolt is raised toward its upper limit of movement, the notch in the top wall permitting further upward movement of the locking bolt upon further continued rotation thereof, whereby to withdraw the lower end of the locking bolt from its position in front of the hasp, and other means on the locking bolt for engaging the top wall of the housing to limit its upward movement.

4. In a device of the class described, the combination of a housing having an open front, a seat for a seal, a notched top wall and a bottom wall having a keyhole slot therein; a slotted cover arranged to cover said open front of the housing, said cover having an apertured flange arranged to extend underneath the bottom wall of the housing with said aperture in register with said keyhole slot, a longitudinally movable and rotatable locking bolt disposed behind the seal and guided to move in said housing, said locking bolt being arranged to lock a hasp member upon an eye associated with the housing and said locking bolt having a handle located exteriorly of the housing, and one end of said locking bolt being adapted to be projected through the key hole slot and aperture to lock the cover to the housing and to lock the hasp member upon the eye, a seal rupturing element carried by said locking bolt arranged to rupture the seal upon raising and partial rotation of the locking bolt, means to position said rupturing element with respect to the seal, said bolt having a radially extending lug adjacent its lower end, and the bottom wall of the housing being provided with stops on both sides of the locking bolt and adapted to cooperate with said lug to limit the rotary movement of the locking bolt.

5. In a device of the class described, the combination of a housing having an open front, a seat for a seal and a keyhole slot in its bottom wall; a slotted flanged cover arranged to cover said open front of the housing, said cover having a flange provided with a keyhole slot arranged to extend underneath the bottom wall of the cover with said keyhole slots in register, a longitudinally movable and rotatable locking bolt disposed behind a seal supported on said seat, said bolt being guided to move in said housing, said locking bolt being arranged to lock a hasp member to an eye member associated with the housing, and said locking bolt having a handle located exteriorly of the housing and one end of said locking bolt being adapted to be projected through the keyhole slots in the bottom wall and flange of the cover to lock the cover to the housing and to lock the hasp member upon the eye, said cover being swingably mounted upon the locking bolt and arranged to be moved into a position covering the open front of the housing and to be moved away therefrom to permit the insertion of a seal, a seal rupturing element carried by the locking bolt arranged to rupture the seal upon the raising and partial rotation of the locking bolt, and cooperating stop means on the housing and locking bolt to locate the seal rupturing element with respect to the seal when the locking bolt is raised toward its upper limit of movement, the lower end of the locking bolt being provided with a radially extending lug arranged to engage in said keyhole slots when the locking bolt is in locking position, and stop means on the bottom wall of the housing cooperating with said lug to limit the rotary movement of the locking bolt.

6. In a device of the class described, the combination of a housing having an open front, a seat for a seal and a bolt hole in its bottom wall, a swingable slotted cover arranged to cover and uncover said open front of the housing, said cover having an apertured flange arranged to extend underneath the bottom wall of the housing with said aperture in register with said bolt hole, a longitudinally movable and rotatable locking bolt disposed behind a seal seated upon said seat and guided to move in said housing, said locking bolt being arranged to lock a hasp member to an eye associated with the housing and said locking bolt having a handle located exteriorly of the housing, and one end of said locking bolt being adapted to be projected through the bolt hole and aperture to lock the cover to the housing and to lock the hasp member upon the eye, a seal rupturing element carried by said locking bolt and arranged to rupture the seal upon the raising and partial rotation of the locking bolt, and a lug on the locking bolt adapted to strike the top wall of the housing for locating the seal rupturing element with respect to the seal when the locking bolt is raised toward its upper limit of movement.

7. In a device of the class described, the combination of a housing having an open front, a seat for a seal and a keyhole slot in its bottom wall; a slotted cover arranged to cover and uncover said open end of the housing, said cover having a flange provided with a keyhole slot and arranged to extend underneath the bottom wall of the housing with the keyhole slots in register, a longitudinally movable and rotatable locking bolt disposed behind a seal seated on said seat, said locking bolt being guided to move in said housing, said locking bolt being arranged to lock a hasp member to an eye associated with the housing, and said locking bolt having a handle located exteriorly of the housing and one end of said locking bolt being adapted to be projected through the keyhole slots in the bottom wall of the housing and in the flange of the cover to lock the cover to the housing, a seal rupturing element carried by said locking bolt arranged to rupture a seal seated upon said seat upon the raising of and partial rotation of the locking bolt, cooperating stop means on the housing and locking bolt for locating the seal rupturing element with respect to the seal when the locking bolt is raised towards its upper limit of movement, and a radially extending lug adjacent the lower end of the bolt arranged to be projected through said keyhole slot and to rest on the hasp member to thereby support the locking bolt at its extreme lower position, and adapted when the locking bolt is raised and rotated to rest upon the bottom wall of the housing and support the bolt in raised position therein.

8. In a device of the class described, the combination of a housing having an open front, a seat for a seal, a notch in its top wall and a bolt hole in its bottom wall; a slotted cover arranged to cover and uncover the open front of the housing, said cover having an apertured flange arranged to extend underneath the bottom wall of the housing with said aperture in register with said bolt hole, a longitudinally movable and rotatable locking bolt disposed behind a seal seated on said seat, said locking bolt being guided to move in said housing, said locking bolt being arranged to lock a hasp member to an eye associated with the housing and said locking bolt having a handle located exteriorly of the housing, and one end of said locking bolt being adapted to be projected through the bolt hole and aperture to lock the cover to the housing and to lock the hasp upon the eye, a seal rupturing element carried by said locking bolt arranged to rupture the seal upon the raising of and partial rotation of the locking bolt, a lug on the locking bolt adapted to engage the top wall for locating the seal rupturing element with respect to the seal when the locking bolt is raised toward its upper limit of movement, said lug being aranged to pass through said notch upon further rotation and upward movement of the locking bolt to disengage the bolt from the hasp, and other means on the locking bolt below said lug for engaging the top wall of the housing to limit the upward movement of the locking bolt.

9. In a device of the class described, the combination of a housing having an open front, a seat for a seal, a notched top wall and a bottom wall having a keyhole slot therein; a swingable slotted cover arranged to cover and uncover the open front of the housing, said cover having an apertured flange arranged to extend underneath the bottom wall of the housing with said aperture in register with said keyhole slot, a longitudinally movable and rotatable locking bolt disposed behind a seal seated on said seat, said locking bolt being guided to move in said housing, said locking bolt being arranged to lock a hasp member upon an eye associated with the housing and said locking bolt having a handle located exteriorly of the housing, and one end of said locking bolt being adapted to be projected through the key hole slot and aperture to lock the cover to the housing and to lock the hasp member upon the eye, a seal rupturing element carried by said locking bolt arranged to rupture the seal upon the raising of and partial rotation of the locking bolt, means to position said rupturing element with respect to the seal, said locking bolt having a radially extending lug adjacent its lower end and the bottom wall of the housing being provided with stops on both sides of the locking bolt and adapted to cooperate with the lug to limit the rotary movement of the locking bolt.

10. In a device of the class described, the combination of a housing having an open front, a seat for a seal and a bolt hole in its bottom wall; a slotted cover arranged to cover said open front of the housing, said cover having apertured flanges arranged to extend above and beneath the housing, a longitudinally movable and rotatable locking bolt guided to move in said housing, and movable through the apertures in the flanges of the cover, said locking bolt having a handle exteriorly of the housing, a seal rupturing element carried by said locking bolt and an end arranged to be projected through the bottom wall and lower cover flange, an eye member associated with the housing and disposed below the same, and a hasp member having a slot whereby it may be placed over the eye member.

11. In a combined lock and seal, a housing having an open front, a swingable cover therefor having a flange on its lower end adapted to underlie the bottom wall of the housing, and a flat spring secured to the inner side of the cover and arranged to engage said lower wall to prevent downward movement of the cover when in place covering the open front of the housing.

ERNEST A. CONAWAY.

REFERENCES CITED

The following references are of record in the file of this patent:

UNITED STATES PATENTS

| Number | Name | Date |
|---|---|---|
| 324,691 | Hien | Aug. 18, 1885 |
| 371,037 | Davis | Oct. 4, 1887 |
| 919,539 | Christian | Apr. 27, 1909 |
| 1,087,081 | Cather | Feb. 10, 1914 |